United States Patent [19]

Mombers

[11] Patent Number: 5,017,061

[45] Date of Patent: May 21, 1991

[54] APPARATUS FOR THE PEELING OF SURFACES, INCLUDING NONPLANAR SURFACES

[75] Inventor: Johannes M. Mombers, Waalwijk, Netherlands

[73] Assignee: ARBA Holding S.A., Luxembourg, Luxembourg

[21] Appl. No.: 416,769

[22] Filed: Oct. 4, 1989

[51] Int. Cl.$^5$ ............................................... B23C 1/20
[52] U.S. Cl. .................................. 409/139; 144/117 R; 144/230; 409/141
[58] Field of Search .............. 409/182, 179, 180, 141, 409/136, 139, 204; 114/222; 51/176, 267; 144/230, 221, 117 R, 117 B; 407/51

[56] References Cited

U.S. PATENT DOCUMENTS

| | | | |
|---|---|---|---|
| 974,000 | 10/1910 | Towne et al. | 114/222 |
| 2,528,809 | 11/1950 | Young | 114/222 |
| 4,948,307 | 8/1990 | Dodds | 409/136 |

FOREIGN PATENT DOCUMENTS

| | | | |
|---|---|---|---|
| 7513217 | 5/1977 | Netherlands | 409/139 |
| 8500375 | 9/1986 | Netherlands . | |
| 685490 | 9/1979 | U.S.S.R. | 144/230 |
| 1236677 | 2/1988 | U.S.S.R. | 409/141 |

*Primary Examiner*—William Briggs
*Attorney, Agent, or Firm*—Wegner, Cantor, Mueller & Player

[57] ABSTRACT

An apparatus for peeling a layer from a surface, including a nonplanar surface such as the hull of a ship, comprises a rotatable substantially cylindrical support with at least two peeling knives projecting from an outer surface thereof. An annular guiding element surrounds each end of the substantially cylindrical support, and these annular guiding elements have different diameters. Preferably, the peeling knives are spaced unequally around the circumference of the substantially cylindrical support.

8 Claims, 2 Drawing Sheets

APPARATUS FOR THE PEELING OF SURFACES, INCLUDING NONPLANAR SURFACES

The present invention relates to an apparatus for the peeling of including nonplanar surfaces.

These apparatuses find employment in the field of ship repair. After the introduction of ships with polyester hulls, it has appeared that the outer covering layer of said hull is attacked by the water, which has a detrimental influence on said layer. Hence it becomes necessary to regularly remove said layer and apply a new layer or coat.

It will be clear that the removal of said layer by hand is a laborious and thus costly job. It is also very boring, so that it is difficult to find staff willing to execute such a job.

Hence there is the need for an apparatus which removes said outer layer or coat mechanically.

Such an apparatus is known from the Dutch patent application No. 8500375.

This application only describes a very primitive apparatus for peeling off said outer layer. This known apparatus comprises:

a substantially cylindrical support, on the surface of which at least two peeling knives extending over a substantial part of the axial length of the support have been provided;

a driving apparatus for making said cylindrical support rotate; and guiding elements, which have been provided at both sides of the cylindrical support, which guiding elements are cylindrical, have a small axial length, and in which the supporting cylinder is journalled.

In this known specification there is provision of means for guiding said known apparatus along the hull of the ship.

Further there is the problem that in this known apparatus, the peeling knives or chisels are regularly distributed over the surface of said cylindrical support. This causes vibrations of the hull being peeled, so that there is a substantial amount of disturbing noise generated by this operation. Further there is the danger that these vibrations may damage either the hull being processed or the peeling apparatus.

Another disadvantage is the vibration of the hull becomes so vigorous, that it becomes impossible to execute the peeling action.

Therefore the present invention provides such an apparatus, in which the peeling knives are irregularly distributed over the surface of said cylindrical support.

This has the advantage that vibrations generated by the operation are considerably reduced, as the times between subsequent "hits" of the hull by the peeling knives is not constant, so that the hull is not vibrated in regular intervals.

Subsequently the present invention will be elucidated with the help of the accompanying drawings, in which.

Figure 1:
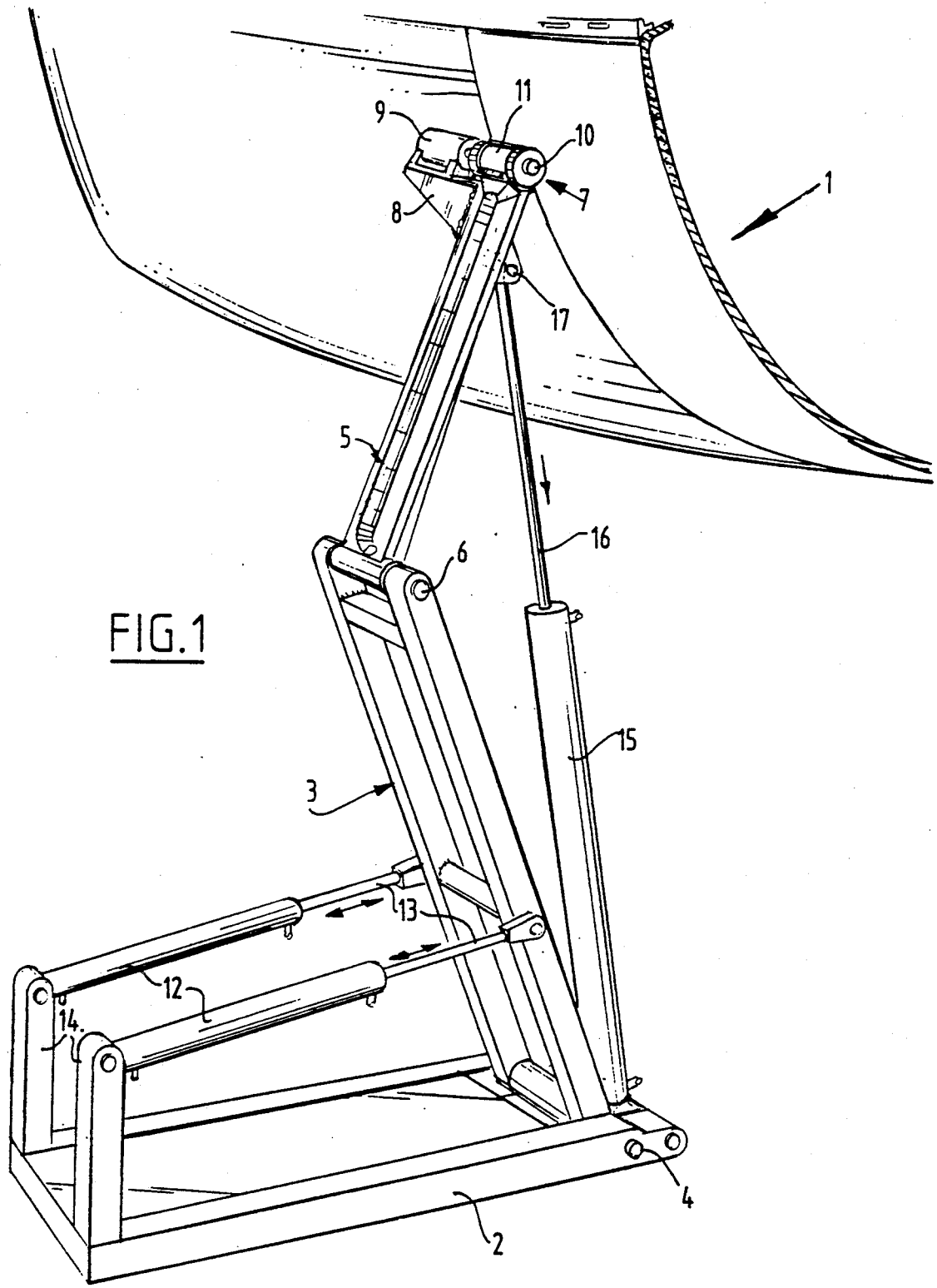
FIG. 1 shows a perspective view of the apparatus according to the present invention.

As is depicted in FIG. 1, the apparatus according to the present invention is used to peel the outer layer of the hull 1 of a ship. This hull is supported by supporting element not shown in the drawing. The apparatus according to the invention is located alongside the ship. This apparatus comprises a frame 2, in which a second arm 3 is rotatably journalled by means of a shaft 4. Further a first arm 5 is journalled into the distal end of the second arm 3 by means of a second shaft 6. On the distal end of the second arm 5 a head 7 has been provided. This head is depicted in greater tail in FIG. 2. Further a bracket 8 has been provided on the distal end of the first arm 5, on which bracket a pneumatic motor 9 has been attached. This pneumatic motor 9 drives the cylindrical support 11 of the head 7 through the driving shaft 10.

Further there has been provided a pair of pneumatic cylinders 12, which are on one end connected rotatably with two legs 14 of the frame 2, and of which the piston shafts 13 are connected with both sides of the arm 3. Through these cylinders 12 the second arm 3 can be rotated.

A second pneumatic cylinder 15 has one end rotatably journalled in the frame 2, and the piston rod 16 thereof is rotatably connected with a bracket 17, which is also connected with the distal end of the first arm 5. Through this second pneumatic cylinder the height of the head 7 relative to the frame 2 can be adjusted. By controlling the pneumatic cyliners 12, 12 and 15, it becomes possible to make the head 7 follow the contours of the hull of the ship. Particularly, by controlling the pneumatic cylinder 15, the height of the head 7 can be controlled, whereas through the cylinders 12, the pressure, with which the head 7 is pressed against the hull, can be controlled. One should bear in mind that there are separate guiding means for guiding the head alongside the hull, which will be described in connection with FIG. 2 of this specification. It is necessary that the location of the head 7 is controlled in one direction, whereas in the other direction the pressure, with which the head is pressed against the hull, is also controlled. The location in the second direction is controlled by said guiding means.

This means that a controlling mechanism must be present for controlling the pressure in the cylinders 12, 12 and 15. This controlling can take place by an automatic controller, which no doubt can be implementd easily by any skilled man in the field of pneumatic and/or hydraulic control. It is also possible, that that control is executed by the human operator of this apparatus.

It will be clear that, as is shown in the drawing, the pressure in the cylinder 15 is decreased continuously, so that the head 7 moves downwards. At the same time the pressure in the cylinders 12 is increased, so that the head 7 follows the contours of the hull while peeling off the outer layer thereof.

The construction of the head 7 will be discussed by referring to FIG. 2.

Figure 2:
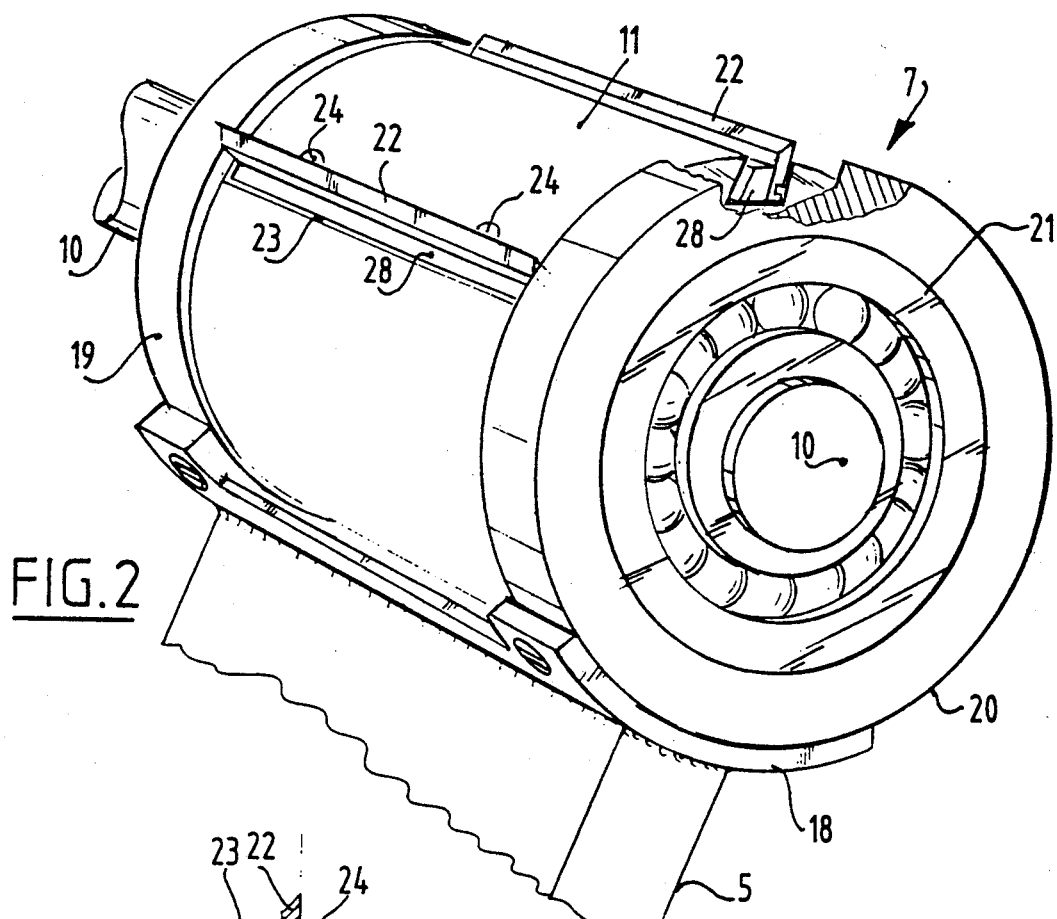
FIG. 2 shows a perspective detailed view of the "head" of the apparatus.

FIG. 2 shows the head 7 in greater detail. On the distal end of the first arm 5, a bracket 18 has been provided, for instance by brazing or welding, and onto which bracket annular guiding elements 19, 20 have been provided. Both annular guiding elements have a different diameter. Within each guiding element a bearing 21 has been provided, for instance in the shape of a roller bearing, and in which a shaft 10 has been journalled. This shaft is driven by the pneumatic motor 9 depicted in FIG. 1.

On the shaft 10, between the two annular guiding elements 19, 20 a cylindrical support 11 has been provided. Through the action of the pneumatic motor 9, the cylindrical support 11 is rotated, including the peeling knives 22 mounted thereon, so that said peeling knives peel the surface of the hull.

In this respect, the outer diameter of the annular guiding element 20 is larger than the outer diameter of the annular guiding element 19. The difference in the radii of these annular guiding elements 19, 20 is more or less equal to the cutting depth of the peeling knives 22. By using the peeling apparatus thus described for peeling in a substantial vertical direction, swaths are peeled off the hull. When one swath has been peeled off, the apparatus is relocated relative to the hull in the direction to the left in FIG. 2, so that the annular guiding element 20 with the largest diameter contacts the peeled off surface of the hull and the other annular guiding element 19, with a smaller diameter, contacts the non-peeled off surface of the hull, so that a layer of substantial equal thickness is peeled off.

If all chisels or cutting knives 22 mounted on the cylindrical support would have an equal circumferential spacing, the hull would be vibrated with equal lapses of times between the subsequent "hits". This would cause resonance of the hull, as discussed above. To avoid this, the peeling knives 22 have been located in the cylindrical support with unequal distances, as is clearly visible in FIG. 3. This causes the lapses of time between subsequent hits to become unequal, so that the hull does not vibrate in regular intervals.

Now the fixation of the peeling knives 22 in the cylindrical support 11 will be described with unequal circumferential spacing, straight slots 23 have been provided in the cylindrical support 11. These slots 23 have a trapezoidal cross-section. As is clearly visible in FIG. 2, each slot has been provided with two grooves 24, extending substantially in the radial direction. Further each cutting knife 22 has been provided with two notches 25, coinciding with the grooves 24. By inserting two screws 26 into holes 27, predrilled in the cilindrical support 11, the cutting knife 22 can be fixed in the radial direction, as the head of the two screws 26 is inserted into the notches 25. To give a good fixation, the screw 26 has to be screwed in, for which it is necessary to use socket head screws.

For fixing the peeling knives 22 in the other direction, a beam 28 has been provided in each of the slots 23. A number of holes has been drilled into each beam, into which screws 29 have been inserted, and by turning those screws 26 outwardly, the knives 22 become fixed also in the direction tangential to the circumference of cylindrical support 11.

This results in a fixation of the cutting knives 22 in the cylindrical support 11, which allows an easy replacement of the peeling knives 22.

The embodiment described so far deals with peeling knives extending over the full axial length of the cylindrical support 11. It is of course also possible to have the knives extending in a more or less screw line-shaped configuration. Also for this case it is possible to have an unequal circumferential spacing of the peeling knives.

According to a further embodiment, which is not described in detail, as it will be clear to each skilled man, each peeling knife is divided in two halves, and in which one half is shifted over a certain angle relative to the other half. This would be the case for all peeling knives. This embodiment also results in the advantages of the present invention.

Of course the man skilled in the art may come to further embodiments. For example, it is possible to use hydraulic cylinders instead of pneumatic cylinders. It is also possible to use a mixture of hydraulic and pneumatic controls, i.e. hydraulic control for the vertical determined movements and pneumatic control for the movements in the horizontal direction.

According to a further embodiment not depicted in the drawing, the "head" is connected with the distal end of the first arm 5 through a rod. There is provided an element, which urges the head towards the hull to be treated with a fixed force. In this embodiment the cylinders are controlled such that the distal end of the first arm follows the contours of the hull more or less. The difference between said controlled movement and the real contour of the hull are compensated by the rod and the urging element. This urging element may be a pneumatic cylinder.

Figure 3:
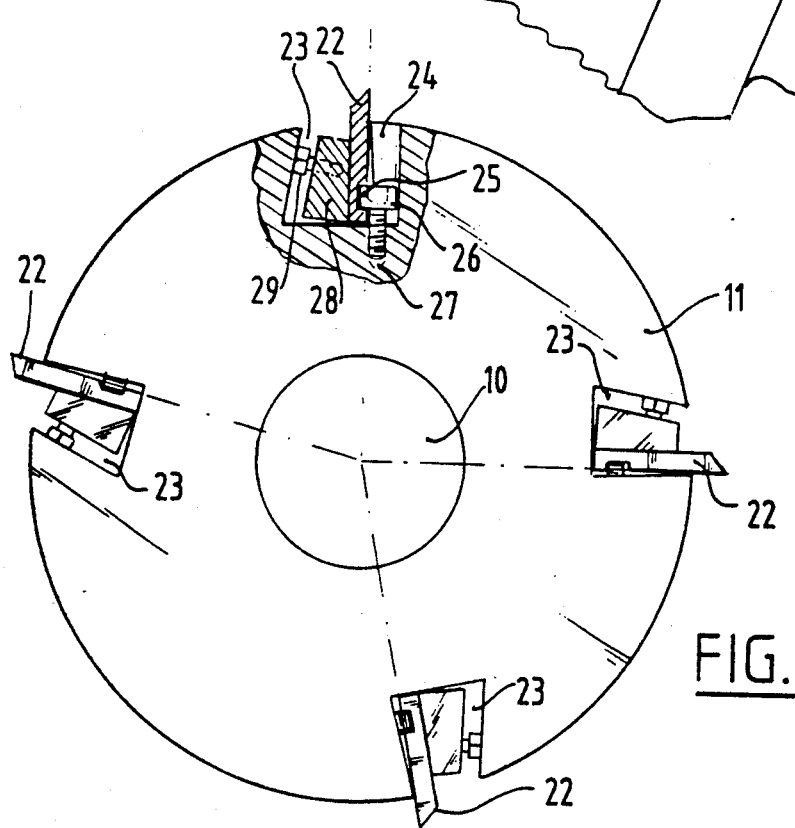
FIG. 3 shows a cross-sectional view of the cylindrical support, used in the present invention.

To avoid unbalance of the cylindrical support caused by unequal distance of the peeling knives, balance weights 41 can be provided onto the support. It is of course also possible to provide said support with balancing slots 42, as schematically shown in FIG. 3.

I claim:

1. An apparatus for peeling a layer from a surface, including a nonplanar surface, said apparatus comprising:
   (a) a substantially cylindrical support, said substantially cylindrical support being axially rotatable;
   (b) a first annular guiding element circumferentially surrounding a first end of said substantially cylindrical support and a second annular guiding element circumferentially surrounding a second end of said substantially cylindrical support, wherein said first and second annual guiding elements have different diameters;
   (c) at least two peeling knives projecting from an outer surface of said substantially cylindrical support and extending along the outer surface of said substantially cylindrical support between said first and second annular guiding elements wherein each of said at least two peeling knives are parallel to each other and are spaced unequally around a circumference of said substantially cylindrical support;
   (d) driving means for axially rotating said substantially cylindrical support; and
   (e) support means for supporting said substantially cylindrical support against the surface to be peeled, said support means comprising:
      (i) a first arm connected at an upper end thereof to said substantially cylindrical support such that said substantially cylindrical support is axially rotatable independent of said first arm;
      (ii) a second arm connected at an upper end thereof to a lower end of said first arm, a lower end of said second arm rotatably connected to a bottom frame; and
      (iii) hydraulic or pneumatic control means cooperating with said first arm, said second arm and said bottom frame for controlling movement of said substantially cylindrical support against a surface to be peeled.

2. The apparatus according to claim 1, wherein said control means comprises a first hydraulic or pneumatic cylinder connecting said first arm and said bottom frame, and a second hydraulic or pneumatic cylinder connecting said second arm and said bottom frame.

3. The apparatus according to claim 1, wherein each of said at least two peeling knives are parallel to an axis of rotation of said substantially cylindrical support.

4. The apparatus according to claim 1, wherein each of said at least two peeling knives are not parallel to an axis of rotation of said substantially cylindrical support.

5. The apparatus according to claim 1, wherein each of said at least two peeling knives extend fully between said first and second annular guiding elements.

6. The apparatus according to claim 1, further comprising balancing means on said substantially circular support for maintaining balance of said substantially cylindrical support as it rotates.

7. The apparatus according to claim 6, wherein said balancing means includes at least one of balancing weights on an outer surface of said substantially circular support or balancing slots formed within said outer surface.

8. The apparatus according to claim 2, wherein said control means comprises a third hydraulic or pneumatic cylinder connecting said second arm and said bottom frame.

* * * * *